United States Patent Office 3,101,997
Patented Aug. 27, 1963

---

3,101,997
CHLORODIFLUOROAMINE AND A PROCESS FOR ITS PREPARATION
Jeremiah P. Freeman and Robert C. Petry, Huntsville, Ala., assignors to Rohm & Haas Company, Philadelphia, Pa., a corporation of Delaware
No Drawing. Filed Oct. 14, 1960, Ser. No. 62,561
3 Claims. (Cl. 23—14)

This invention concerns chlorodifluoroamine, $ClNF_2$, and processes for the preparation thereof. This application is a continuation-in-part of Serial No. 28,024, filed May 10, 1960, expressly abandoned on November 30, 1960.

A previously known fluorine compound, difluoroamine, $HNF_2$, is used in the preparation of this new compound, chlorodifluoroamine. $HNF_2$ may be prepared by the processes set forth in Kennedy et al. JACS 81, 2906 (1959), and Lawton et al. JACS 81, 4755 (1959). Chlorodifluoroamine is prepared by the reaction of difluoroamine with boron trichloride ($BCl_3$).

Another previously known compound, tetrafluorohydrazine, $N_2F_4$, can be used as starting material for the preparation of chlorodifluoroamine. $N_2F_4$ can be prepared by the process shown in Colburn et al. JACS 80, 5004 (1958). $ClNF_2$ can be prepared by reacting $N_2F_4$ with chlorine or iodine monochloride.

Chlorodifluoroamine, because of its high order of reactivity, is a valuable intermediate for the preparation of a variety of chemicals.

Although $ClNF_2$ can be prepared from $N_2F_4$, it can also be used to prepare $N_2F_4$. Thus, $ClNF_2$ reacts with mercury to form $N_2F_4$ and mercurous chloride. $ClNF_2$ also reacts with divinyl mercury ($Hg(CH=CH_2)_2$) to form $N_2F_4$ and vinyl chloride. The use for vinyl chloride is well known to those skilled in the art. Polymers and copolymers of vinyl chloride are used in a wide variety of applications.

Chlorodifluoroamine also finds utility as an oxidizing agent and also as a bleaching agent for materials such as textiles.

One process for producing $ClNF_2$ is the reaction of $HNF_2$ with $BCl_3$. Whereas the molar ratios of $HNF_2$ to $BCl_3$ can be varied from 2 to 1 to 1 to 2, the preferred molar ratio of reactants is 1 to 1.

The reaction proceeds rapidly at low temperatures and the reaction temperature may be varied over the range from about $-35°$ C. to about $25°$ C. A preferred method of preparation comprises distilling equimolar quantities of $BCl_3$ and $HNF_2$ into a reaction vessel at a temperature of from about $-130°$ C. to about $-196°$ C. and allowing the reaction mixture to warm to room temperature, i.e., about 20 to $30°$ C. The $ClNF_2$ fraction can then be isolated by distilling the volatile products through a series of traps, the temperatures of which are maintained such that the $ClNF_2$ fraction is separated from less volatile contaminants. The $ClNF_2$-containing fraction can be further purified by passage of the fraction through a tower packed with an alkaline material, such as sodium hydroxide or potassium hydroxide, preferably supported on an inert material such as kieselguhr, asbestos, etc. This step is then followed by passage of the gas through a low temperature trap to remove water. An alternate way of purifying the $ClNF_2$ fraction is to contact said fraction with an aqueous solution of sodium hydroxide or potassium hydroxide followed by passage through a low temperature trap to remove water.

Chlorodifluoroamine is also produced by ultraviolet irradiation of a mixture of $Cl_2$ and $N_2F_4$. The system rapidly reaches equilibrium;

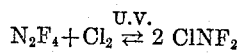

$$N_2F_4 + Cl_2 \underset{}{\overset{U.V.}{\rightleftarrows}} 2\ ClNF_2$$

and the usual laws of chemical equilibrium apply to the system. The equilibrium concentration of $ClNF_2$ is given by the equation:

(1) $\qquad (ClNF_2) = [K(N_2F_4)(Cl_2)]^{1/2}$

Study of the equilibrium constant in the temperature range from $29°$ to $83°$ C. has given the following equation for the temperature dependence on the equilibrium constant:

(2) $\qquad \log K = -\dfrac{2640}{T} + 5.77$

When utilized as a preparative method, the yield of $ClNF_2$ is dependent on the temperature and molar ratios of $Cl_2$ to $N_2F_4$ as defined by Equations 1 and 2. An increase in temperature and increase in the $Cl_2$ to $N_2F_4$ ratio, increases the conversion to $ClNF_2$. The upper temperature limit is that at which $ClNF_2$ or $N_2F_4$ attacks the reaction vessel to give decomposition products. In Pyrex apparatus, this temperature is about $150°$ C. The irradiation time required to reach equilibrium is dependent on the intensity of the light source and the pressure of the reactants. In the equilibrium studies which were made, irradiation times of 10–15 minutes were sufficient to reach equilibrium using a Hanovia EH-4 lamp as the light source and reactant pressures in the neighborhood of 600 mm. in 100 cc. Pyrex reaction bulbs. Separation of $ClNF_2$ from unreacted $N_2F_4$ and $Cl_2$ can be accomplished by an efficient low temperature fractionating column or by the application of gas chromatography. Whereas some $ClNF_2$ is obtained when the molar ratio of $N_2F_4$ to $Cl_2$ is 1 to 1, high excesses of $Cl_2$ up to a molar ratio of 1 $N_2F_4$ to 100 $Cl_2$ are preferred.

Iodine monochloride can be substituted for chlorine in the above reaction. The molar ratios of iodine monochloride to $N_2F_4$ can be varied from 1.5 to 1 to about 50 to 1. Using iodine monochloride with $N_2F_4$, the irradiation period should be 2 to 4 hours depending on the reaction temperature. At room temperature, an irradiation period of three hours is satisfactory.

CHARACTERIZATION OF $ClNF_2$

Mass Spectrum and Molecular Weight

The mass spectrum is consistent with the formula $ClNF_2$ shown by the following cracking pattern obtained on a Consolidated Electrodynamics Model 620 Mass Spectrometer.

Fragmentation Pattern of $ClNF_2$

| m/e | R.I. | Ion |
|---|---|---|
| 14 | 3.8 | $N^+$ |
| 19 | 1.6 | $F^+$ |
| 33 | 37.1 | $NF^+$ |
| 35 | 21.9 | $Cl^+$ |
| 37 | 6.5 | |
| 49 | 30.1 | $NCl^+$ |
| 51 | 7.2 | |
| 52 | 100 | $NF_2^+$ |
| 68 | 26.2 | $NFCl^+$ |
| 70 | 22.4 | |
| 72 | 8.5 | $Cl_2^+$ |
| 74 | 1.3 | |
| 87 | 46.4 | $NF_2Cl^+$ |
| 89 | 14.5 | |

The peaks attributed to $Cl_2^+$ may arise from partial disproportionation of the sample to $Cl_2$ and $N_2F_4$ in the metal inlet system of the mass spectrometer. Samples giving essentially the same cracking pattern were shown to contain less than 0.5% $Cl_2$ by U.V. spectrometry.

A molecular weight determination of $ClNF_2$ by the vapor density method gave the theoretical value of 87.5 within experimental error. Two determinations gave measured values of 87.5 and 87.8.

*Vapor Pressure*

The vapor pressure curve for $ClNF_2$ was measured and can be expressed by the equation $$\log_{10} P_{mm.} = -\frac{950}{T} + 7.478$$

The extrapolated boiling point was found to be $-67°$ C. The heat of vaporization calculated from the above equation is 4350 cal./mole with a Trouton constant of 21.0.

Vapor pressures were measured with the aid of a spoon gauge operated as a null instrument by balancing against a mercury manometer. Temperatures were measured with a calibrated copper-constantan thermocouple.

The melting point of $ClNF_2$ was not obtained but lies between $-183°$ C. and $-196°$ C.

The infrared spectrum of $ClNF_2$ consists of very strong bands centered at 10.8 (triplet), 11.7 (doublet) and 14.4$\mu$ (triplet); a doublet of medium intensity centered at 13.4$\mu$ and weak bands at 5.4, 5.7, 5.9 and 7.3$\mu$. Since $N_2F_4$ exhibits a very strong absorption band at 9.9$\mu$ the presence of this material as impurity in $ClNF_2$ is readily detectable.

REACTIONS OF CHLORODIFLUOROAMINE

*Reaction of $ClNF_2$ With Mercury*

Mercury and $ClNF_2$ were shown to react according to the following equation:

$$2NF_2Cl + 2Hg \rightarrow Hg_2Cl_2 + N_2F_4$$

A sample of $ClNF_2$ ($1.26 \times 10^{-3}$ mole), previously shown to contain <0.5% $Cl_2$ by U.V. absorption, was stirred with excess mercury in a Pyrex reaction vessel at room temperature for 2 hours. The recovered volatile material amounted to $0.63 \times 10^{-3}$ mole. Mass spectral analysis showed 95% $N_2F_4$ and 4% $N_2F_2$ and 1% $SiF_4$. The $N_2F_2$ and $SiF_4$ were by-products of the reaction since the starting $ClNF_2$ showed neither $N_2F_2$ nor $SiF_4$ by mass spectral analysis. The non-volatile residue from the reaction was found to be $Hg_2Cl_2$ containing a trace of $HgF_2$.

*Reaction of $ClNF_2$ With Divinyl Mercury*

The reaction of divinyl mercury [1] with $ClNF_2$ has been found to proceed essentially as follows:

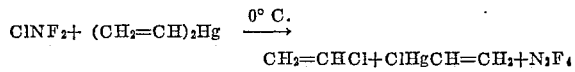

A 100 cc. Pyrex reaction vessel equipped with stopcock, magnetic stirrer and a mercury manometer (protected with a layer of KelF oil) was charged in vacuo with 4.0 g. ($1.6 \times 10^{-2}$ mole) divinyl mercury and $2.5 \times 10^{-3}$ mole $ClNF_2$. The reaction mixture was stirred at 0° C. for 3 hours after which time there was no further pressure decrease. The reaction mixture was fractionated in vacuo through traps maintained at $-80$, and $-196°$ C. The $-196°$ fraction amounted to $2.4 \times 10^{-3}$ mole. Analysis of the fraction by mass and infrared spectrometry showed a mixture of $N_2F_4$ and vinyl chloride in approximately equal amount. The $-80°$ C. fraction contained the excess divinyl mercury. The non-volatile solid residue in the reaction bulb was found to be $CH_2=CHHgCl$ with a small amount of Hg. Both the $N_2F_4$ and vinyl chloride yield in this reaction (based on the above equation) were approximately 95%.

The following examples set forth certain well-defined embodiments of the application of this invention. They are not, however, to be considered as limitations thereof, since many modifications may be made without departing from the spirit and scope of this invention.

Unless otherwise specified, all parts are parts by weight. All temperatures are centigrade unless otherwise noted.

EXAMPLE I

$HNF_2$—$BCl_3$ Reaction

A 1-liter Pyrex reaction bulb equipped with stopcock and condensing arm was charged in vacuo with $1.40 \times 10^{-2}$ mole each of boron trichloride and difluoroamine. The reactants were distilled into the reaction bulb with the condensing arm maintained at approximately $-130°$ C. (methyl cyclohexane slush bath temperature). The cooling bath was removed and the reaction mixture allowed to warm to ambient temperature. Reaction occurred below room temperature during the warm-up period and the bulb became coated with white solid. The pressure in the reaction bulb corresponded to $2.0 \times 10^{-2}$ mole gaseous material at the completion of the reaction. Mass spectral and infrared analysis of the gaseous material showed the presence of $ClNF_2$, HCl, and $Cl_2$ with small amounts of $BCl_3$ and $BF_3$. The solid non-volatile reaction product was not identified. The gaseous reaction mixture was separated by low temperature vacuum fractionation through traps maintained at $-140$ and $-196°$ C. The $-196°$ fraction contained the $ClNF_2$ contaminated with HCl and small amounts of $Cl_2$ and $BF_3$. Purification was accomplished by passage of this fraction through an ascarite (sodium hydroxide on an asbestos carrier) packed tower at 0° C. and low pressure, followed by fractionation through a trap maintained at $-130°$ C. to remove water. The passed fraction collected at $-196°$ C. amounted to $6.96 \times 10^{-3}$ mole (49.8% yield) and was essentially pure $ClNF_2$.

Calculated for $ClNF_2$: Cl, 40.54%; F, 43.45%. Found: Cl, 39.92%; F, 42.35%.

An alternate purification method consists of exposing the $ClNF_2$ fraction to 3 N sodium hydroxide solution (at room temperature) with stirring for 30 minutes, followed by fractionation through a trap at $-130°$ C. to remove water.

EXAMPLE II

$N_2F_4$—$Cl_2$ Reaction

A 100 cc. Pyrex reaction bulb containing 50 mm. $N_2F_4$ and 456 mm. $Cl_2$ was thermostated in a constant temperature water-bath at 83.10° C. and irradiated with a Hanovia EH–4 lamp for 15 minutes at which time equilibrium had been established. Analysis of the reaction mixture by quantitative infrared spectrometry showed the presence of 22.0 mm. $ClNF_2$ and 39.0 mm. $N_2F_4$. Separation of the $ClNF_2$ from the unreacted $Cl_2$ and $N_2F_4$ was accomplished by gas chromatography on a silica gel column at $-45°$ C. The $ClNF_2$ peak was trapped out of the effluent helium stream in a trap at $-196°$ C.

EXAMPLE III

$N_2F_4$—$ICl$ Reaction

A 500 cc. Pyrex reaction bulb, charged in vacuo with $6 \times 10^{-3}$ mole ICl and $4.3 \times 10^{-3}$ mole $N_2F_4$, was irradiated at room temperautre with a Hanovia EH–4 lamp for 3 hours. Work-up of the reaction mixture by fractionation through traps at $-80$ and $-196°$ C. and infrared analysis of the $-196°$ C. fraction indicated the information of approximately $1 \times 10^{-3}$ mole $ClNF_2$. Subsequent

---

[1] B. Bartocha and F. G. A. Stone, Z. Naturforschg. 13b, 347 (1958).

irradiation of the reaction mixture for 12 hours produced little additional $ClNF_2$ indicating equilibrium had been reached.

We claim:
1. Chlorodifluoroamine, $ClNF_2$.
2. A process for the preparation of chlorodifluoroamine which comprises reacting difluoroamine with boron trichloride at a temperature of from about $-35°$ C. to about $25°$ C. and recovering the chlorodifluoroamine so formed.
3. A process as set forth in claim 2 in which the molar ratio of difluoroamine to boron trichloride is 1 to 1.

References Cited in the file of this patent
UNITED STATES PATENTS

| 2,736,694 | Gunning | Feb. 28, 1956 |
| 2,950,954 | Mador | Aug. 30, 1960 |
| 2,971,820 | Rolingson | Feb. 14, 1961 |
| 2,987,456 | Lauer | June 6, 1961 |

OTHER REFERENCES

Petry: "J. American Chem. Soc.," 82, #9, pp. 2400, 2401, May 5, 1960.